(12) United States Patent
Hoover et al.

(10) Patent No.: US 11,861,698 B2
(45) Date of Patent: *Jan. 2, 2024

(54) VEHICLE SELECTION PLATFORM

(71) Applicant: Capital One Services, LLC, McLean, VA (US)

(72) Inventors: Jason Hoover, Grapevine, TX (US); Micah Price, Anna, TX (US); Qiaochu Tang, The Colony, TX (US); Stephen Wylie, Carrollton, TX (US); Geoffrey Dagley, McKinney, TX (US)

(73) Assignee: Capital One Services, LLC, McLean, VA (US)

( * ) Notice: Subject to any disclaimer, the term of this patent is extended or adjusted under 35 U.S.C. 154(b) by 288 days.

This patent is subject to a terminal disclaimer.

(21) Appl. No.: 17/248,368

(22) Filed: Jan. 22, 2021

(65) Prior Publication Data

US 2021/0142406 A1 May 13, 2021

Related U.S. Application Data

(63) Continuation of application No. 16/548,060, filed on Aug. 22, 2019, now Pat. No. 10,902,515.

(51) Int. Cl.
| | |
|---|---|
| *G06Q 40/02* | (2023.01) |
| *G06Q 40/00* | (2023.01) |
| *G06Q 20/10* | (2012.01) |
| *G06Q 20/24* | (2012.01) |
| *G06Q 40/03* | (2023.01) |
| *G06Q 30/0601* | (2023.01) |
| *G06N 20/00* | (2019.01) |

(52) U.S. Cl.
CPC .............. *G06Q 40/03* (2023.01); *G06N 20/00* (2019.01); *G06Q 30/0631* (2013.01)

(58) Field of Classification Search
CPC .. G06Q 40/025; G06Q 30/0631; G06Q 40/08; G06N 20/00
USPC .......................................................... 705/38
See application file for complete search history.

(56) References Cited

U.S. PATENT DOCUMENTS

| | | | |
|---|---|---|---|
| 8,706,610 B2 * | 4/2014 | Fenichel ................ | G06Q 40/04 705/37 |
| 10,902,515 B1 | 1/2021 | Hoover | |
| 2008/0059317 A1 * | 3/2008 | Chandran .............. | G06Q 20/20 705/16 |
| 2016/0364783 A1 * | 12/2016 | Ramanuja .......... | G06Q 30/0625 |

* cited by examiner

*Primary Examiner* — Hai Tran
(74) *Attorney, Agent, or Firm* — Harrity & Harrity, LLP

(57) ABSTRACT

A device receives transaction data associated with an individual that is participating in a transaction for a vehicle. The device identifies transaction term values relating to the transaction. The device determines scores indicating likelihoods of the transaction term values contributing to prevention of completion of the transaction. The device receives vehicle inventory data describing vehicles. The device identifies one or more recommended vehicles, of the vehicles, based on performing a vehicle search of the vehicles described by the vehicle inventory data, where the vehicle search identifies the one or more recommended vehicles based on one or more filters. The device provides vehicle offer data for the one or more recommended vehicles to one or more other devices to permit the one or more other devices to use the vehicle offer data as part of another transaction for a particular vehicle of the one or more vehicles.

20 Claims, 9 Drawing Sheets

Example Transaction Terms
- Pre-approval Transaction Terms
- Application Transaction Terms
- Counteroffer Transaction Terms
- Conversation Transaction Terms

120
Process transaction data and/or conversation data to identify transaction terms

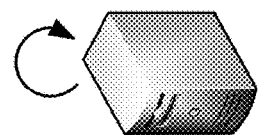
Vehicle Selection Platform

122
Use data model to determine one or more scores that indicate one or more likelihoods of the transaction terms contributing to prevention of completion of a transaction for the vehicle

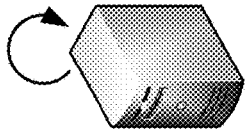
Vehicle Selection Platform

FIG. 1C

VEHICLE SELECTION PLATFORM

RELATED APPLICATION

This application is a continuation of U.S. patent application Ser. No. 16/548,060, filed Aug. 22, 2019 (now U.S. Pat. No. 10,902,515), which is incorporated herein by reference.

BACKGROUND

Machine learning is a field of computer science that gives computers the ability to learn without being explicitly programmed. For example, a machine learning model may be trained on a set of training data, such that the model may be used to process live data to generate useful predictions and/or classifications.

SUMMARY

According to some implementations, a method may include receiving transaction data associated with an individual that is participating in one or more transactions for one or more vehicles. The transaction data may include application process data associated with an application by the individual for a loan for a vehicle of the one or more vehicles, and response data that describes one or more responses to the application. The method may include identifying, by processing the transaction data, a set of transaction term values relating to the transaction for the vehicle. The method may include determining, by using a data model to process the set of transaction term values, one or more scores that indicate one or more likelihoods of the set of transaction term values contributing to prevention of completion of a transaction, of the one or more transactions, for the vehicle identified in the application. The data model may have been trained using machine learning to process transaction term values. The method may include receiving vehicle inventory data describing a set of vehicles. The method may include identifying one or more recommended vehicles, of the set of vehicles, based on performing a vehicle search of the set of vehicles described by the vehicle inventory data. The vehicle search may identify the one or more recommended vehicles based on one or more filters associated with the one or more scores. The method may include providing vehicle offer data for the one or more recommended vehicles to one or more other devices to permit the one or more other devices to use the vehicle offer data as part of another transaction for a particular vehicle of the one or more vehicles.

According to some implementations, a device may include one or more memories, and one or more processors, operatively coupled to the one or more memories, to receive transaction data associated with an individual that is participating in a transaction for a vehicle. The transaction data may include application process data associated with an application by the individual for a loan, and response data that describes one or more responses to the application. The one or more processors may identify a set of transaction term values relating to the transaction for the vehicle by processing the transaction data. The one or more processors may determine, by using a data model to process the set of transaction term values, one or more scores that indicate one or more likelihoods of the set of transaction term values contributing to prevention of completion of the transaction for the vehicle. The data model may have been trained using machine learning to process transaction term values. The one or more processors may receive vehicle inventory data describing a set of vehicles. The one or more processors may receive vehicle preferences data that identifies a set of vehicle preferences of the individual. The one or more processors may identify one or more recommended vehicles, of the set of vehicles, based on performing a vehicle search of the set of vehicles described by the vehicle inventory data. The vehicle search may identify the one or more recommended vehicles based on a set of filters that include one or more filters capable of filtering the set of vehicles based one or more preferences of the individual and one or more preferences of one or more loan providers. The one or more processors may provide vehicle offer data for the one or more recommended vehicles to one or more other devices to permit the one or more other devices to use the vehicle offer data as part of another transaction for a particular vehicle of the one or more vehicles.

According to some implementations, a non-transitory computer-readable medium may store one or more instructions. The one or more instructions, when executed by one or more processors of a device, may cause the one or more processors to: receive application process data associated with an application for an individual that is applying for a loan for a vehicle. The one or more instructions may cause the one or more processors to receive response data that describes one or more responses to the application. The one or more instructions may cause the one or more processors to identify a set of transaction term values relating to the transaction for the vehicle by processing the application process data and the response data. The one or more instructions may cause the one or more processors to determine, by using a machine-learning-driven analysis to process the set of transaction term values, one or more scores that indicate one or more likelihoods of the set of transaction term values contributing to prevention of completion of a transaction, of the one or more transactions, for the vehicle identified in the application. The one or more instructions may cause the one or more processors to receive vehicle inventory data describing a set of vehicles. The one or more instructions may cause the one or more processors to identify one or more recommended vehicles, of the set of vehicles, based on performing a vehicle search of the set of vehicles described by the vehicle inventory data. The vehicle search may identify the one or more recommended vehicles based on one or more filters. The one or more instructions may cause the one or more processors to provide vehicle offer data for the one or more recommended vehicles to one or more other devices to permit the one or more other devices to use the vehicle offer data as part of another transaction for a particular vehicle of the one or more vehicles.

BRIEF DESCRIPTION OF THE DRAWINGS

FIGS. 1A-1D are diagrams of one or more example implementations described herein.

DETAILED DESCRIPTION

Figure 1A:
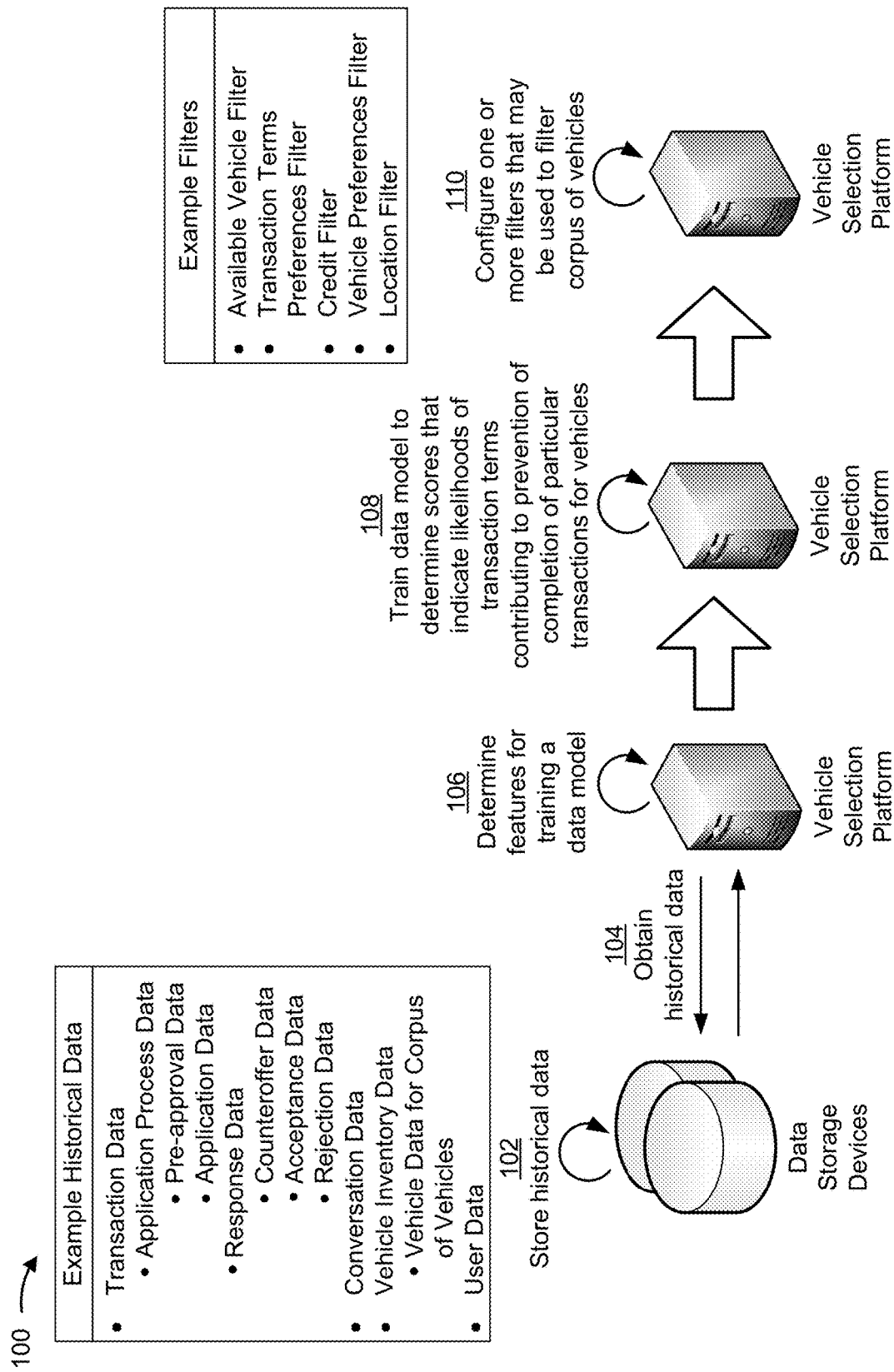

The following detailed description of example implementations refers to the accompanying drawings. The same reference numbers in different drawings may identify the same or similar elements.

To complete a transaction for a vehicle (e.g., to purchase a vehicle, rent a vehicle, and/or the like), an individual may visit a dealership to look at vehicles in person or may visit a website of the dealership to look at images or videos of vehicles. An agent of the dealership may be tasked with assisting the individual in identifying and purchasing a vehicle (e.g., via in-person conversations with the individual, via a phone conversation with the individual, via a chat feature of the website, and/or the like). In many cases, the agent may assist the individual with obtaining a loan that may be used to purchase the vehicle. For example, the agent may assist the individual in completing an application for the loan, in submitting the loan to one or more loan providers, in handling responses made by one or more loan providers (e.g., a response may reject the application, may make a counteroffer that includes different transaction terms, and/or the like), and/or the like.

However, if the individual expects to complete a transaction for a vehicle, but is unable to obtain a favorable loan, the individual may become dissatisfied and may decide to look at other dealerships for making a vehicle purchase. Additionally, there is not an efficient and/or effective way to quantify the affects that receiving a rejected application or a counteroffer with unfavorable transaction terms may have on the individual. This is because individuals have different temperaments, different levels of sensitivity to their financial situations, and/or the like. This wastes resources (e.g., processing resources, network resources, and/or the like) of devices used to generate and/or submit the application for the loan, wastes resources used to generate and/or provide counteroffers to the application, wastes resources of a device used by a relationship manager of a loan provider who may be providing further support to the agent of the dealership during the transaction with the individual, and/or the like.

Furthermore, after it becomes apparent that the individual will be unable to purchase the vehicle, there is not an efficient and/or effective way to identify optimal vehicles to recommend to the individual. This is because vehicle preferences of the individual may be unavailable to the agent of the dealership, purchasing preferences of the individual may be unavailable to the agent (e.g., purchasing preferences that specify which transaction terms are most important to the individual, that specify how much the individual is willing to modify particular transaction terms, and/or the like), vehicle inventory of specific vehicles that satisfy the vehicle preferences and/or the purchasing preferences of the individual may be unavailable to the agent, and/or the like. This causes resources of devices involved in the transaction to be wasted by recommending vehicles that will not be of interest to the individual, by recommending vehicles that are not affordable to the individual (e.g., because the one or more loan providers are likely to offer transaction terms which the individual is unable to accept), and/or the like.

Some implementations described herein provide a vehicle selection platform to determine that an individual, who is engaging in a transaction for a vehicle, is unlikely to complete the transaction, and to identify one or more recommended vehicles to offer to the individual. For example, the individual may submit an application for a loan for the vehicle and may receive a response rejecting the application, a response with a counteroffer that includes new and/or modified transaction terms (e.g., a higher annual percentage rate (APR), a higher down payment, and/or the like), and/or the like. In this case, the vehicle selection platform may receive application process data associated with the application (e.g., pre-approval data, application data, and/or the like) and may receive response data (e.g., rejection data, counteroffer data, and/or the like). The vehicle selection platform may process the application process data and/or the response data to identify a set of transaction terms relating to the transaction for the vehicle (e.g., one or more transaction terms in the application, one or more transaction terms in a counteroffer made by a loan provider, and/or the like).

Additionally, the vehicle selection platform may determine one or more scores that indicate one or more likelihoods of the set of transaction terms contributing to prevention of completion of the transaction for the vehicle. For example, the vehicle selection platform may use machine learning to process the set of transaction terms to determine the one or more scores. In this case, the vehicle selection platform may receive vehicle inventory data describing a set of vehicles, credit data that identifies a credit score or credit history of the individual, location data that specifies a geographic location of a device of the individual or a dealership near the individual, vehicle preferences data that identifies vehicle preferences of the individual, and/or the like. This may allow the vehicle selection platform to use one or more filters to search a corpus of vehicles to identify one or more recommended vehicles for the individual. The one or more filters may include an available vehicle filter, a transaction terms preferences filter, a credit filter, a vehicle preferences filter, a location filter, and/or the like. The vehicle selection platform may provide vehicle offer data for the one or more recommended vehicles to a device of an agent of the dealership, to a device of a relationship manager of a loan provider, to a device of the individual, and/or the like.

In this way, the vehicle selection platform identifies that the individual is unlikely to complete the transaction for the vehicle and identifies optimal replacement vehicles to offer the individual. This conserves resources of devices involved in the transaction that would otherwise needlessly generate, submit, and/or process an application for a loan in a situation where the individual would ultimately leave the dealership and not complete the transaction, conserves resources of a device associated with a relationship manager of a loan provider who might otherwise unsuccessfully assist the agent of the dealership in selling the vehicle, conserves resources of a device that would otherwise be used to identify sub-optimal vehicles to recommend to the individual (e.g., vehicles that the individual is unlikely to purchase, unlikely to receive favorable transaction terms for, and/or the like), and/or the like.

FIGS. 1A-1D are diagrams of one or more example implementations 100 described herein. Example implementation(s) 100 may include a group of data storage devices, a vehicle selection platform, a device used by an agent of a dealership (shown as Dealer Device), a device used by a relationship manager of a loan provider (shown as Relationship Manager Device), and a group of devices used to process applications (e.g., loan applications) (shown as Application Processing Device 1, . . . , Application Processing Device N). As shown in FIGS. 1A-1D, the vehicle selection platform may determine that an individual, who is engaging in a transaction for a vehicle, is unlikely to complete the transaction, and may identify one or more recommended vehicles to offer to the individual.

As shown in FIG. 1A, and by reference number 102, the group of data storage devices may store historical data that may be used to train a data model (and/or may be used to configure one or more filters, as further described below). For example, the group of data storage devices may store historical data that includes transaction data, conversation data, vehicle inventory data, user data, and/or the like. A description of how transaction data, conversation data, vehicle inventory data, and/or user data is collected is described further herein.

The transaction data may include, for a group of individuals who applied for loans for vehicles, application process data associated with a set of applications for the loans, response data that describes one or more responses to the applications, and/or the like. The application process data may include pre-approval data, application data, and/or the like. The pre-approval data may include credit data for an individual (e.g., a credit score, a credit history, and/or the like), employment history data for an individual, income of an individual, and/or the like. The application data may describe and/or identify one or more transaction terms of a loan for a vehicle, such as a first term that identifies a name of an individual, a second term that identifies an amount of the loan, a third term that identifies an amount of a down payment, a fourth term that identifies an annual percentage rate (APR), a fifth term that identifies an amount for a monthly payment, and/or the like. The response data may include acceptance data indicating that an application has been accepted by a loan provider, rejection data indicating that an application has been rejected by a loan provider, counteroffer data for a counteroffer made by a loan provider (e.g., which may include one or more new transaction terms, one or more modified transaction terms, and/or the like), and/or the like.

Figure 1B:
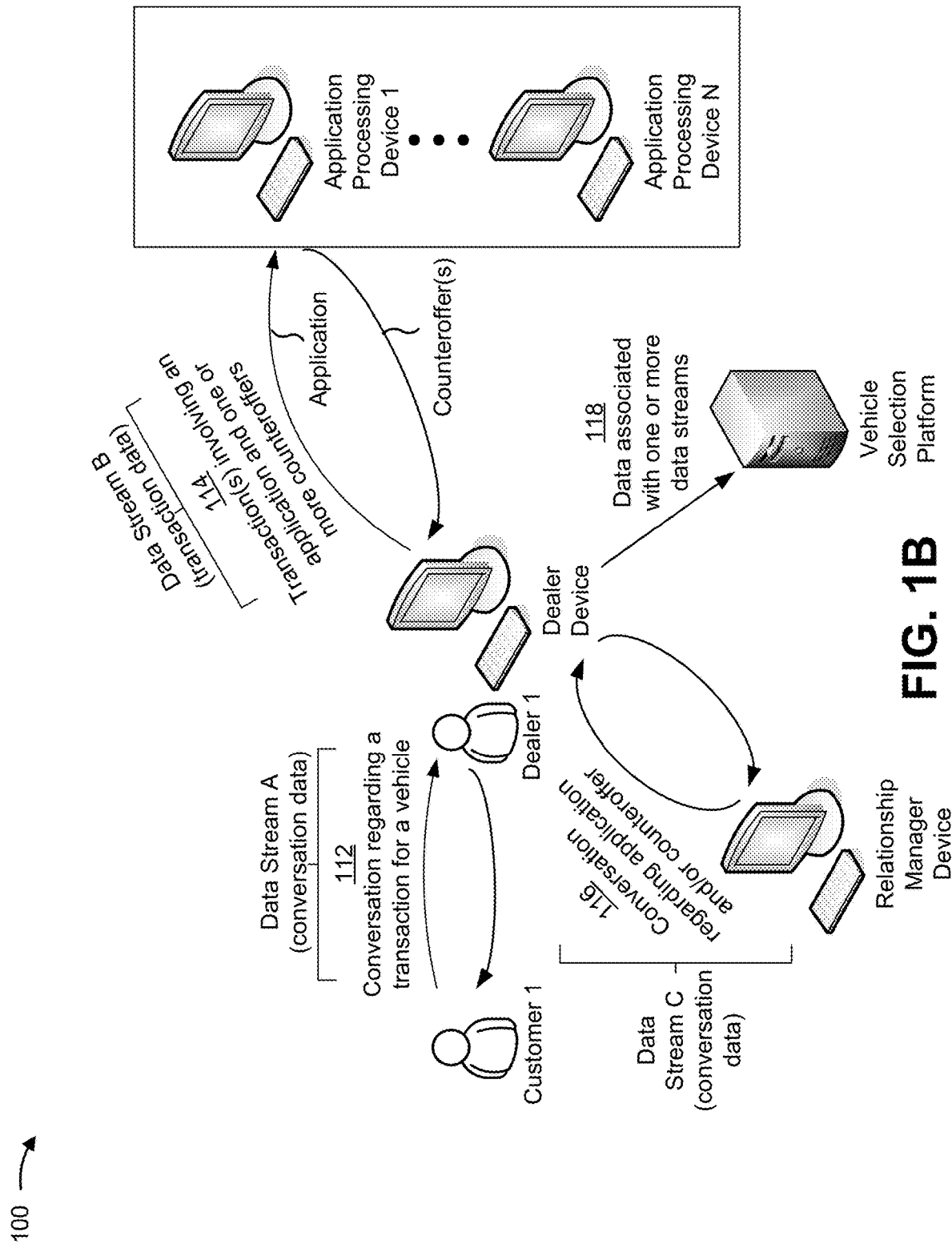

In some implementations, the transaction data include a document that formally describes transaction terms of an application and/or a counteroffer, an audio of a phone conversation where oral statements are made that specify particular transaction terms, and/or the like. In some implementations, one or more agents of a loan provider may be authorized to make a counteroffer. For example, the counteroffer may be provided by a relationship manager, by another type of agent of the loan provider (e.g., an agent accessing an application processing device, as shown in FIG. 1B), and/or the like.

The conversation data may include conversation data that describes conversations between individuals and agents of dealerships, conversation data that describes conversations between the agents of the dealerships and agents (e.g., relationship managers) of the one or more loan providers, and/or the like. The conversation data may be audio data for a recorded conversation, text data for a conversation made via a messaging service, video data for a conversation made through a video session, and/or the like.

The vehicle inventory data may include data that describes a group of vehicles that have been offered for sale and/or that are being offered for sale. For example, the vehicle inventory data for a vehicle may include a vehicle identifier, vehicle identification data (e.g., data indicating a year of the vehicle, a make of the vehicle, a model of the vehicle, and/or the like), price data (e.g., a purchasing price, a monthly rate, and/or the like), vehicle characteristics data that describe a set of characteristics of the vehicle (e.g., characteristics indicating a type of vehicle, a color of the vehicle, that the vehicle has a sunroof, that the vehicle has a certain type of transmission, and/or the like), transaction history data (e.g., purchasing data that describes a transaction that was made when the vehicle was purchased, and/or the like), and/or the like.

The user data may include credit data for individuals, transaction history data that identifies previous transactions in which the individuals were participants, vehicle preferences data for the individuals, and/or the like. The credit data may include credit score data that identifies a credit score of an individual, credit report data that summarizes a credit report of an individual, credit transaction data that describes a set of transactions involving one or more lines of credit that have been opened by an individual, credit application data that identifies and/or describes applications that an individual has submitted for credit (e.g., over a given time period), and/or the like.

The transaction history data may identify a set of previous transactions in which an individual was a participant, and may include results data indicating whether a transaction was completed, transaction summary data describing one or more events relating to the transaction (e.g., an individual was not approved for a loan, and/or the like), user sentiment data describing one or more emotions and/or opinions expressed by an individual, and/or the like. The vehicle preferences data may identify a preference for a particular type of vehicle, a preference for a particular characteristic or group of characteristics of a vehicle, a preference for a particular transaction term or group of transaction terms when transacting for a vehicle (e.g., a particular price or price range, a particular APR, a particular down payment, and/or the like), and/or the like.

As shown by reference number 104, the vehicle selection platform may obtain the historical data from the group of data storage devices. For example, the vehicle selection platform may obtain the historical data via an application programming interface (API) or another type of communication interface. In some cases, the vehicle selection platform may submit a request for historical data which may cause a data storage device to provide the vehicle selection platform with the historical data. Additionally, or alternatively, a data storage device may be configured to provide the vehicle selection platform with the historical data (e.g., periodically, over an interval, and/or the like).

As shown by reference number 106, the vehicle selection platform may determine a set of features for training a data model. For example, the vehicle selection platform may perform a set of feature identification techniques to identify a set of features that may be used to train a data model. The set of feature identification techniques may include using a technique that involves text mining and latent semantic analysis (LSA), a trend variable analysis technique, an interest diversity analysis technique, a technique using a neural network, a composite indicators analysis technique, a clustering technique, a regression technique, and/or the like.

A feature may be a value (e.g., a numerical value, a character value, and/or the like) or a group of values (e.g., a term that comprises multiple character values, a combination of terms, a combination of a numerical value, a character value, and/or a term, and/or the like) that represent a measurable property or characteristic that may be used for training the data model. A feature may be a value or group of values that is likely to affect whether an individual completes a transaction for a vehicle (e.g., by increasing a likelihood that an individual will complete a transaction for a vehicle, by decreasing a likelihood that an individual will complete a transaction for a vehicle, and/or the like).

For example, a feature may be one or more application process data values, one or more application data values, one or more conversation data values, one or more vehicle inventory data values, one or more user data values, a combination of one or more values, a difference or discrepancy between two or more values, a trend or pattern associated with a group of values, and/or the like. To provide a few specific examples, the set of features may include a first feature for a transaction term value of an application for a loan that represents a low APR (e.g., relative to an average), a second feature for a transaction term value of a counteroffer to the application that represents a high APR, a third feature for a difference between the first feature and the second feature, a fourth feature for an average APR for a group of applications for loans, a fifth feature for a conversation data value that represents an emotion expressed by an individual, a sixth feature that represents a credit score of an individual, and/or the like.

In some implementations, the vehicle selection platform may perform one or more pre-processing operations before determining the set of features. For example, the vehicle selection platform may perform one or more natural language processing techniques to identify a first set of transaction terms in an application, to identify a second set of transaction terms in a counteroffer to the application, to identify a third set of transaction terms in a conversation between two or more individuals (e.g., an individual attempting to purchase a vehicle and an agent of a dealer, an agent of a dealership and a relationship manager of a loan provider, and/or the like), a fourth set of transaction terms in a credit report or credit history of an individual, and/or the like. In some cases, such as when audio data and/or video data is present, the vehicle selection platform may perform one or more data conversion techniques to convert the audio data and/or the video data into a format capable of being processed by the one or more natural language processing techniques (e.g., a text format, and/or the like).

Additionally, or alternatively, the vehicle selection platform may perform the one or more natural language processing techniques to identify conversation data values that represent sentiments of individuals. For example, the vehicle selection platform may perform a sentiment analysis on conversation data between an individual and an agent of a dealership to identify a set of emotions or opinions expressed by the individual and/or the agent during the conversation. As used herein, conversation data values may be said to be transaction terms (e.g., a conversation between an individual and an agent of a dealership may be said to be part of the transaction for the vehicle).

In some implementations, the vehicle selection platform may perform a feature identification technique to determine features. For example, the vehicle selection platform may perform a trend variable analysis technique to identify features associated with changes to data over a given time period. In this case, the vehicle selection platform may aggregate values periodically and may compare the aggregated values to identify changes over a given time period. This may allow the vehicle selection platform to identify trends or patterns that may be used as features. As a specific example, the vehicle selection platform may determine that individuals are 30% more likely to leave the dealership without purchasing a vehicle if a difference between a particular transaction term in an application for a loan and a corresponding modified transaction term provided in a counteroffer satisfies a threshold value. It is to be understood that this is provided by way of example, and that in practice, any number of different feature identification techniques may be used to determine features (e.g., text mining and LSA, a technique using a neural network, and/or the like).

As shown by reference number 108, the vehicle selection platform may train the data model to determine scores that indicate likelihoods of transaction terms contributing to prevention of completion of particular transactions for vehicles. For example, the vehicle selection platform may process the set of features using one or more machine learning techniques to generate a data model that is able to receive particular transaction terms as input and is able to output scores that indicate likelihoods of the particular transaction terms contributing to prevention of completion of a transaction. The one or more machine learning techniques may include a classification-based technique, a regression-based technique, a clustering-based technique, a technique using a neural network, and/or the like.

In some implementations, the vehicle selection platform may train a neural network based on the set of features. For example, the vehicle selection platform may train a neural network that has an input layer, one or more intermediate layers (e.g., a fully connected layer, a convolutional layer, a pooling layer, a recurrent layer, and/or the like), and an output layer. For example, the set of features may be hyperparameters that are used as part of a cost function of the neural network. In this case, the vehicle selection platform may perform a feedforward technique to provide particular transaction terms (e.g., that are part of a test dataset) as input to the neural network, and the neural network may output one or more scores that indicate likelihoods of the particular transaction terms contributing to prevention of completion of a transaction for a vehicle.

Additionally, the vehicle selection platform may compare the one or more scores to known values and may determine an error value based on the comparison between the one or more scores and the known values. The error value may be used to update the cost function (e.g., which may assign weights to particular features of the set of features), and the vehicle selection platform may perform a backpropagation technique to iteratively train the neural network until a threshold level of accuracy has been reached.

As shown by reference number 110, the vehicle selection platform may configure one or more filters that may be used to filter the corpus of vehicles. For example, if the vehicle selection platform determines that one or more scores output by the data model are indicative of a threshold likelihood (e.g., a high likelihood) of transaction terms contributing to preventing the completion of a transaction for a vehicle, then the vehicle selection platform may need to identify optimal vehicles to recommend to the individual. To identify optimal vehicles to recommend to the individual, the vehicle selection platform may be configured with one or more filters that can filter the set of vehicles to identify one or more recommended vehicles that are likely to be offered to the individual using transaction terms that are likely to be accepted by the individual. Filtering the corpus of vehicles, as used herein, may involve the vehicle selection platform searching through a data structure that stores vehicle inventory data that describes and/or identifies the vehicles in the corpus and using one or more filters to identify optimal vehicles to recommend.

The one or more filters may include an available vehicle filter, a transaction terms preferences filter, a credit filter, a vehicle preferences filter, a location filter, and/or the like. The available vehicle filter may filter the corpus of vehicles to identify vehicles that are presently available for sale. The transaction terms preferences filter may filter the corpus of vehicles based on preferences of an individual for particular transaction terms and/or particular transaction term values. For example, if an individual prefers a maximum down payment of $500, the vehicle selection platform may filter the corpus of vehicles to identify particular vehicles that have been known to be sold with a down payment of $500 or less. The credit filter may filter the corpus of vehicles based on whether a loan provider is likely to accept or reject an application based on credit data of the individual, may filter the corpus of vehicles based on whether a permissible range of transaction values, which are offered for a given vehicle, are available to an individual based on the individual's credit data, and/or the like.

The vehicle preferences filter may filter the corpus of vehicles based on one or more vehicle preferences of the individual. For example, if an individual prefers a particular type of vehicle, a vehicle with a particular characteristic or group of characteristics, and/or the like, the vehicle selection platform may filter the corpus of vehicles to identify vehicles of the particular type, vehicles that have the particular characteristic or group of characteristics, and/or the like. The location filter may filter the corpus of vehicles based on whether location data (e.g., of a device of an individual, of a particular dealership, and/or the like) satisfies configurable location criteria (e.g., a criterion that indicates that a for-sale vehicle must be within a threshold distance of the individual or a dealership that the individual is transacting with, and/or the like). Any combination of filters described herein may be utilized by the vehicle selection platform.

In some implementations, the vehicle selection platform may filter the corpus of vehicles using a second data model. For example, the vehicle selection platform may train a second data model using machine learning to determine a set of scores that are part of a metric that measures a predicted level of interest of the individual in particular vehicles, given a predicted set of transaction terms to which the individual is predicted to be eligible. Additional information regarding the second data model is provided further herein.

In this way, the vehicle selection platform is configured with a data model and/or one or more filters that may be used to provide real-time assistance to agents and/or relationship managers assisting with transactions for vehicles, as further described below.

As shown in FIG. 1B, conversation data and/or transaction data may be collected via a set of data streams and may be provided to the vehicle selection platform. The conversation data and/or the transaction data that is provided and/or received via the set of data streams may be provided and/or received via one or more application programming interfaces (APIs) and/or via one or more other types of communication interfaces.

As shown by reference number 112, a first data stream (shown as Data Stream A) may be used to generate a first set of conversation data that describes a conversation between an individual (shown as Customer 1) and an agent of a dealership (shown as Dealer 1). For example, a first data stream may be used to generate, provide, and/or receive conversation data between a device accessible to the individual and the dealer device, between the dealer device and an external recording device, and/or the like. The conversation may be a conversation regarding a transaction (e.g., a sale) of a vehicle, a conversation regarding an application for a loan for the vehicle, a conversation regarding a counteroffer that has been received in response to the application, and/or the like.

In some implementations, the individual and the agent may engage in an in-person conversation at the dealership. In some cases, the agent may, with the individual's permission, record the conversation (e.g., which may cause an audio file to be generated on the dealer device). In other cases, the agent may manually input notes from the conversation into an interface of the dealer device. In some implementations, the individual and the agent may engage in a conversation via a telephone. In this case, an audio file may be generated for the recorded conversation. In some implementations, the individual may use a user device to engage in a discussion with the agent via a chat interface of a website of the dealership, via an electronic mail (e-mail) service, and/or the like. In this case, text data describing the conversation may be provided to the dealer device.

As an example, the individual may work with the agent of the dealership to submit an application for a loan, where the application includes a set of transaction terms (e.g., a transaction term specifying a proposed APR, a transaction term specifying a proposed down payment, and/or the like). The individual may also engage in a conversation with the agent, where the individual indicates which transaction terms are most important, whether the individual is open to changing particular transaction terms (and/or by how much), and/or the like.

As another example, as further described below, the agent may be provided with a counteroffer to the application. In this example, the agent and the individual may engage in a conversation where the individual may indicate whether the counteroffer is adequate, may indicate a reason why the counter offer is adequate (or inadequate), may make statements that express a willingness (or unwillingness) to compromise in negotiations for the loan for the vehicle, and/or the like.

As shown by reference number 114, a second data stream (shown as Data Stream B) may be used to generate transaction data involving an application for a loan for a vehicle and one or more counteroffers to the application. For example, a second data stream may be used to generate, provide, and/or receive transaction data between the dealer device and one or more application processing devices of the group of application processing devices. The transaction data may include pre-approval data, application data for the application, and/or counteroffer data for the one or more counteroffers.

In some implementations, the dealer device may provide the application to an application processing device (e.g., via the second data stream). In some implementations, an agent of a loan provider (e.g., a human agent, a virtual agent, and/or the like) may review the application for the loan and may, based on the review, generate and provide the dealer device with counteroffer data for a counteroffer. The counteroffer may include one or more transaction terms that are different from a set of transaction terms that were included in the application (e.g., a modified term, a new term, and/or the like). Counteroffers may, in some implementations, be received from multiple application processing devices associated with multiple loan providers.

As an example, an application processing device may receive an application for a loan. An agent may review the application and may, based on a credit score of the individual and/or one or more other factors, determine that the individual is not eligible to receive a loan with the terms specified in the application. In this example, the agent may use the application processing device to generate a counteroffer (e.g., that includes terms that the individual is eligible to receive) and may provide the counteroffer to the dealer device.

As shown by reference number 116, a third data stream (e.g., shown as Data Stream C) may be used to generate conversation data and/or transaction data. For example, the third data stream may be used to generate, provide, and/or receive conversation data and/or transaction data between the dealer device and the relationship manager device.

As an example, a relationship manager of a loan provider may be tasked with providing useful recommendations to the agent of the dealership to assist the agent in closing a deal. In this example, the relationship manager may use the relationship manager device to provide the dealer device (e.g., via the third data stream) with conversation data that describes a recommendation to assist the agent in closing a deal, may use the relationship manager device to call the agent (e.g., which may cause a recorded call to be provided to the dealer device), may use the relationship manager device to provide the dealer device with a counteroffer, and/or the like. The recommendation may include a recommendation to attempt to sell the individual a different vehicle, a recommendation on how to help the individual to accept one or more modified terms that are included in a counteroffer, and/or the like.

In some implementations, multiple data streams described herein may be represented as a single data stream. For example, if the relationship manager is authorized to make a counteroffer, the second data stream and the third data stream may be a single data stream between the dealer device and the relationship manager device.

As shown by reference number 118, the dealer device may provide data associated with the set of data streams to the vehicle selection platform. For example, the dealer device may provide conversation data and/or transaction data to the vehicle selection platform via one or more APIs.

In this way, conversation data and/or transaction data may be collected and provided to the vehicle selection platform for further processing.

As shown in FIG. 1C, and by reference number 120, the vehicle selection platform may process the conversation data and/or the transaction data to identify transaction terms. For example, the vehicle selection platform may use one or more data conversion techniques and/or one or more natural language processing techniques (e.g., as described in connection with FIG. 1A) to identify transaction terms within the conversation data and/or the transaction data. The transaction terms may include one or transaction terms found in the application for the loan for the vehicle, one or more transaction terms found in a counteroffer made in response to the application, one or more transaction terms found in a first conversation between the individual and the agent of the dealership, one or more transaction terms found in a second conversation between the agent of the dealership and a relationship manager, and/or the like.

As shown by reference number 122, the vehicle selection platform may use the data model to determine one or more scores that indicate one or more likelihoods of the transaction terms contributing to prevention of completion of a transaction for the vehicle. For example, the vehicle selection platform may provide, as input to the data model, the transaction terms, a set of features that correspond to a subset of the transaction terms, historical data relating to the individual, and/or the like (collectively referred to as input data), to cause the data model to output the one or more scores. The historical data may include historical transaction data, historical conversation data, historical features that had been previously determined, and/or the like.

In some implementations, the vehicle selection platform may determine a set of features that correspond to a subset of the transaction terms. For example, the vehicle selection platform may perform one or more feature identification techniques, as described in connection with FIG. 1A, to determine a set of features that correspond to a subset of the transaction terms. As a particular example, an application for a loan for a vehicle may include ten transaction terms. By processing the ten transaction terms using the one or more feature identification techniques, the vehicle selection platform may determine that only five of the transaction terms are features capable of contributing to the prevention of completion of the transaction of the vehicle. This may allow the vehicle selection platform to determine scores that are more accurate than scores that would be determined had all ten transaction terms been provided as input to the data model, conserves resources (e.g., processing resources, network resources, memory resources, and/or the like) that would be wasted to process data that would product inaccurate results, and/or the like.

In some implementations, the vehicle selection platform may determine the one or more scores based on historical data. For example, the application may have an identifier of the individual and the vehicle selection platform may use the identifier to perform a search query to obtain the historical data relating to the individual. This may allow the vehicle selection platform to provide the historical data as input to the data model (e.g., in addition to the transaction data and/or the conversation data) and to cause the data model to output one or more scores that are more accurate than one or more scores that would have been generated had the historical data not been available, thereby conserving resources that would have been wasted producing data with suboptimal results.

In some implementations, the vehicle selection platform may, as described herein, determine the one or more scores after receiving a counteroffer. In this case, the transaction data may include counteroffer data, the conversation data may include one or more conversations relating to the counteroffer that was made, and/or the like. In some implementations, the vehicle selection platform may determine the one or more scores prior to submitting the application for the loan. For example, the vehicle selection platform may predict whether particular loan providers will accept the application, reject the application, and/or provide a counteroffer to the application, and/or may predict particular transaction terms that would be included in the counteroffer. In this case, the vehicle selection platform may determine the one or more scores based on the transaction data, the conversation data, and/or the prediction. This may allow the vehicle selection platform to identify one or more recommended vehicles (as described further herein) prior to submitting the application for the loan for the vehicle, thereby conserving resources that would otherwise be wasted generating counteroffers and/or rejections, only to have the individual not complete the transaction.

In this way, the vehicle selection platform determines one or more scores that indicate one or more likelihoods of the transaction terms contributing to prevention of completion of a transaction for the vehicle.

Figure 1D:
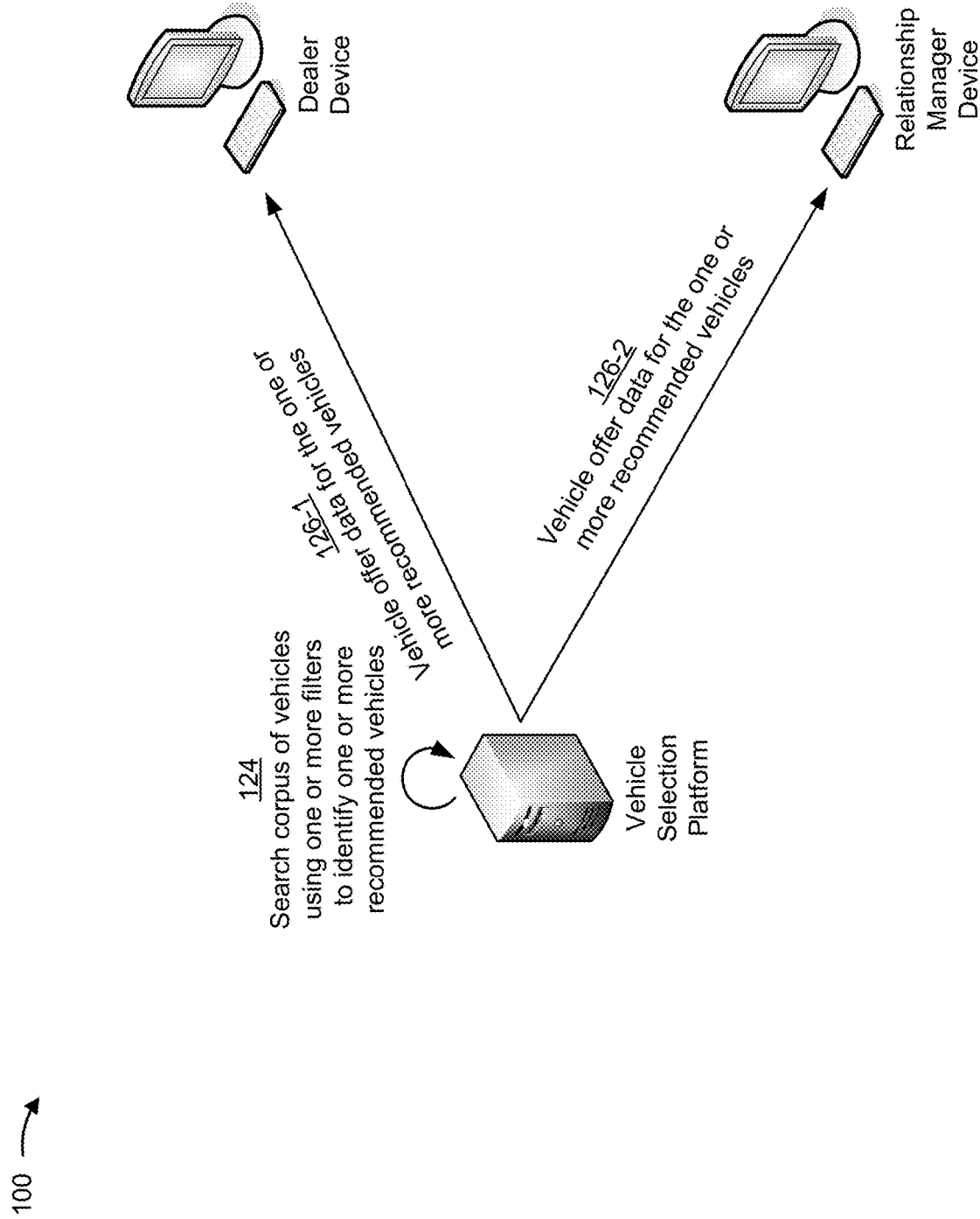

As shown in FIG. 1D, and by reference number 124, the vehicle selection platform may search the corpus of vehicles (or a subset of the corpus) using one or more filters to identify one or more recommended vehicles. For example, the vehicle selection platform may determine that the one or more scores satisfy a threshold confidence level that the transaction terms will contribute to prevention of completion of the transaction for the vehicle, which may cause the vehicle selection platform to identify the one or more recommended vehicles. To identify the one or more recommended vehicles, the vehicle selection platform may have access to a data structure that stores vehicle data for the corpus of vehicles and may be configured in a manner that allows the vehicle selection platform to use the one or more filters when searching the corpus to identify the one or more recommended vehicles. The one or more filters, as defined elsewhere herein, may include an available vehicle filter, a transaction terms preferences filter, a credit filter, a vehicle preferences filter, a location filter, and/or the like.

As an illustrative example, the corpus of vehicles may describe 10,000 vehicles (e.g., which includes in-stock vehicles and out-of-stock vehicles). In this example, the vehicle selection platform may use the available vehicle filter to determine that there are 5,000 in-stock vehicles available for sale. Additionally, the vehicle selection platform may use the transaction terms preferences filter, the credit filter, the vehicle preferences filter, and/or the location filter, to identify 10 vehicles to recommend to the individual. For example, the vehicle selection platform may use a location filter to determine that, of the 5,000 in-stock vehicles, 250 vehicles are available within a threshold distance of the individual. Furthermore, the vehicle selection platform may use a vehicle preferences filter to determine that 50 vehicles, of the 250 vehicles, satisfy the vehicle preferences of the individual. Moreover, the vehicle selection platform may use the credit filter and/or the transaction terms preferences filter to determine that 10 vehicles, of the 50 vehicles, are capable of being sold with transaction terms that will be agreed upon by both the individual and a particular loan provider.

Additionally, or alternatively, the vehicle selection platform may identify one or more recommended vehicles using the second data model. For example, the vehicle selection platform may provide, as input to the second data model, the one or more scores, the transaction data, the conversation data, the historical data relating to the individual, the set of features, and/or the like, to cause the second data model to determine a set of scores that are part of a metric that measures a predicted level of interest of the individual in particular vehicles.

The set of scores may be determined for each vehicle, of the corpus of vehicles, and may be determined based on whether a vehicle is available for sale, based on whether a vehicle is available within a threshold geographic location of the individual (and/or the dealership at which the individual is transacting), based on an analysis of the credit data of the individual relative to transaction term values that particular loan providers are willing to accept, based on vehicle preferences of the individual, and/or the like. To identify the one or more recommended vehicles, the vehicle selection platform may, for example, compare each score to a threshold score and may identify, as the one or more recommended vehicles, one or more vehicles that correspond to one or more scores that satisfy the threshold score.

As shown by reference number 126-1, the vehicle selection platform may provide vehicle offer data for the one or more recommended vehicles to the dealer device. For example, the vehicle selection platform may provide, for the one or more recommended vehicles, vehicle offer data that identifies and/or describes the one or more recommended vehicles, and/or the like.

In some implementations, the vehicle selection platform may provide the dealer device with vehicle offer data that includes one or more transaction recommendations. For example, the vehicle selection platform may generate a transaction recommendation that includes a set of instructions on recommended ways to interact with the individual. The set of instructions may include a first instruction that recommends a set of transaction terms for the application for a recommended vehicle (e.g., which may be predicted to be transaction terms that the individual and a particular loan provider will both accept), a second instruction that identifies which transaction terms to highlight as important transaction terms when conversing with the individual, a third instruction that describes a recommended sales technique to use when interacting with the individual (e.g., which may cater to a personality type of individual, as may have been determined by analyzing the conversation data), and/or the like.

As shown by reference number 126-2, the vehicle selection platform may provide vehicle offer data for the one or more recommended vehicles to the relationship manager device. For example, the vehicle selection platform may provide the vehicle offer data to the relationship manager device to permit the relationship manager to use the vehicle offer data to assist the agent of the dealership with selling the individual one of the recommended vehicles. In some implementations, the vehicle selection platform may provide the relationship manager device with vehicle offer data that includes one or more transaction recommendations (e.g., recommendations that are often made by relationship managers). Additionally, or alternatively, the vehicle selection platform may provide the vehicle offer data to a device associated with the individual. This may allow the individual to view the one or more recommended vehicles on a user interface display. In some cases, the vehicle offer data may highlight particular aspects of each recommended vehicle that are predicted to be appealing to the individual.

In this way, the vehicle selection platform identifies that the individual is unlikely to complete the transaction for the vehicle and identifies one or more optimal replacement vehicles to offer the individual.

As indicated above, FIGS. 1A-1D are provided merely as one or more examples. Other examples may differ from what is described with regard to FIGS. 1A-1D. For example, there may be additional devices and/or networks, fewer devices and/or networks, different devices and/or networks, or differently arranged devices and/or networks than those shown in FIGS. 1A-1D. Furthermore, two or more devices shown in FIGS. 1A-1D may be implemented within a single device, or a single device shown in FIGS. 1A-1D may be implemented as multiple and/or distributed devices. Additionally, or alternatively, a set of devices (e.g., one or more devices) included in the one or more example implementations 100 may perform one or more functions described as being performed by another set of devices included in the one or more example implementations 100.

Figure 2:
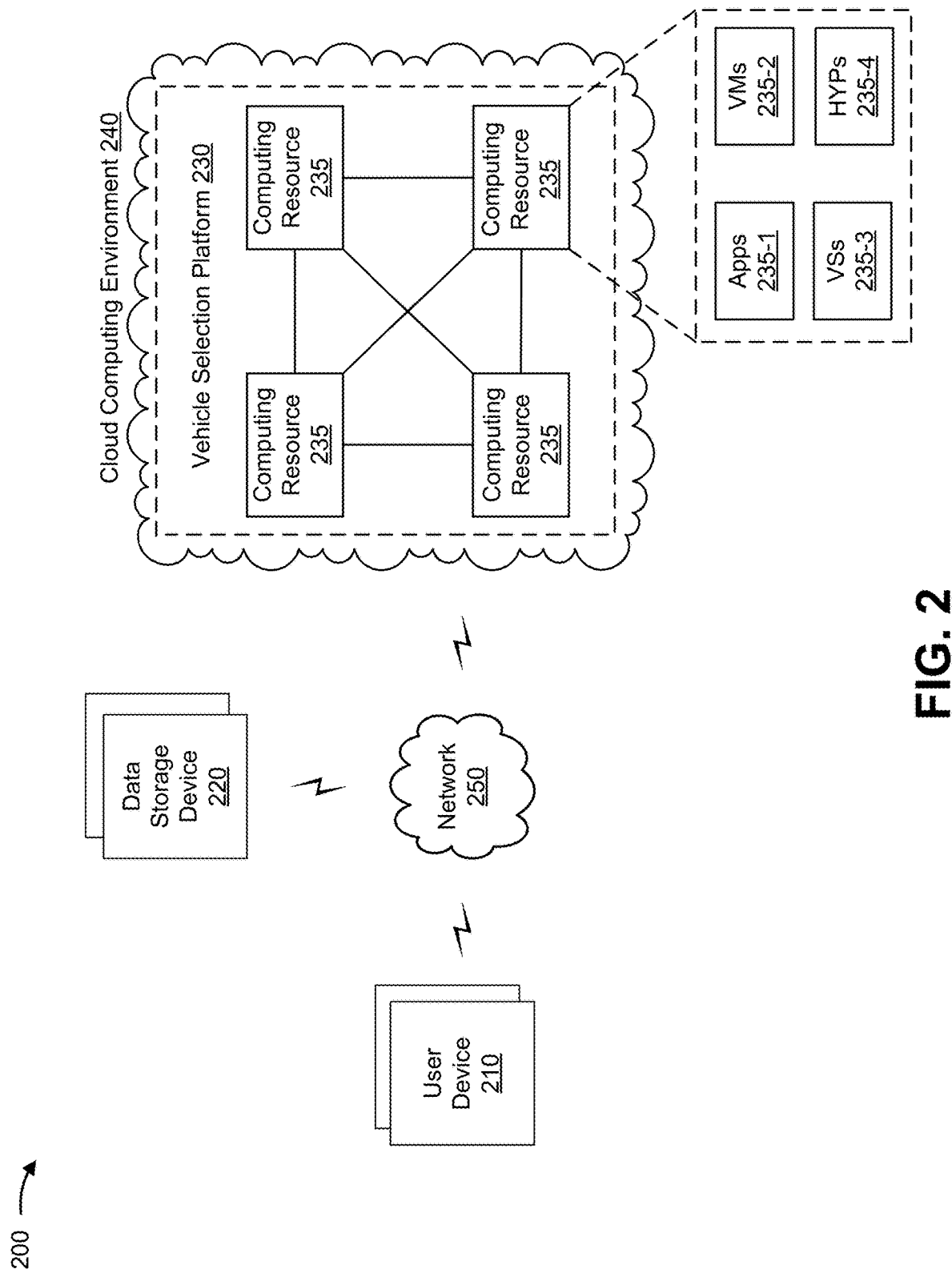
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, a data storage device 220, a vehicle selection platform 230 hosted within a cloud computing environment 240, and a network 250. Devices of environment 200 may interconnect via wired connections, wireless connections, or a combination of wired and wireless connections.

User device 210 includes one or more devices capable of receiving, generating, storing, processing, and/or providing data associated with an application for a loan for a vehicle. For example, user device 210 may include a device or machine, such as a mobile phone (e.g., a smart phone, a radiotelephone, and/or the like), a laptop computer, a tablet computer, a handheld computer, a server computer, a gaming device, a wearable communication device (e.g., a smart wristwatch, a pair of smart eyeglasses, and/or the like), or a similar type of device or machine.

In some implementations, a first user device 210 may be accessible to an individual that is applying for a loan for a vehicle. Additionally, or alternatively, a second user device 210 may be accessible to an agent of a dealership that is assisting the individual in purchasing the vehicle. Additionally, or alternatively, a third user device 210 may be accessible to a relationship manager of a loan provider that is assisting the agent with the transaction to purchase the vehicle. Additionally, or alternatively, a group of user devices 210 may be accessible to a corresponding group of individuals that are capable of processing the application for the loan for the vehicle. One or more implementations described herein may involve user devices 210 providing and receiving data. While these implementations describe the data as being provided directly between two devices, it is to be understood that in some implementations, the data may be provided between two devices via one or more intermediary devices. Additionally, some implementations described herein refer to sending and/or receiving data via data streams. It is to be understood that data provided and/or received via a data stream is to be provided and/or received via one or more application programming interfaces (APIs) and/or via one or more other types of communication interfaces.

In some implementations, the first user device 210 and the second user device 210 may establish a first data stream. For example, the first user device 210 may provide the application for the loan to the second user device 210 via the first data stream, may provide question and answer data regarding purchasing a vehicle via the first data stream, and/or the like. In some implementations, the second user device 210 and the group of user devices 210 may establish a second data stream. For example, the second user device 210 may provide the application to the group of user devices 210 (e.g., via the second data stream), which may cause the group of user devices 210 to provide the second user device with particular counter-offers to the application (e.g., via the second data stream), with an indication that the application has been approved (e.g., via the second data stream), and/or the like. In some implementations, the second user device 210 and the third user device 210 may establish a third data stream. For example, the second user device 210 and the third user device 210 may provide and/or receive conversation data via the third data stream.

Data storage device 220 includes one or more devices capable of receiving, storing, generating, determining, and/or providing data associated with a set of transactions for vehicles. For example, data storage device 220 may include a server device or a group of server devices. In some implementations, a group of one or more data storage devices 220 may store historical data that includes transaction data, conversation data, vehicle inventory data, user data, and/or the like, each as defined elsewhere herein.

In some implementations, the group of one or more data storage devices 220 may provide historical data to vehicle selection platform 230. Additionally, or alternatively, the group of one or more data storage devices 220 may provide user data for an individual to vehicle selection platform 230. Additionally, or alternatively, the group of one or more data storage devices 220 may provide vehicle inventory data to vehicle selection platform 230.

Vehicle selection platform 230 includes one or more devices capable of receiving, storing, generating, determining, and/or providing data associated with a set of transactions for vehicles. For example, vehicle selection platform 230 may include a server device (e.g., a host server, a web server, an application server, and/or the like), a data center device, or a similar device. In some implementations, vehicle selection platform 230 may host and/or support an application (e.g., a web application, a mobile application, a desktop application, and/or the like) that assists agents of a dealership with retaining customers (e.g., customers that may have difficulty being approved for a loan, customers that have a discrepancy between a quality of vehicle desired relative to a loan that has been awarded, and/or the like). In some implementations, vehicle selection platform 230 may be configured with one or more data models and/or one or more filters, as further described elsewhere herein.

In some implementations, as shown, vehicle selection platform 230 may be hosted in cloud computing environment 240. In some implementations, vehicle selection platform 230 might not be cloud-based (i.e., may be implemented outside of a cloud computing environment) or may be partially cloud-based.

Cloud computing environment 240 includes an environment that hosts vehicle selection platform 230. Cloud computing environment 240 may provide computation, software, data access, storage, and/or the like services that do not require end-user knowledge of a physical location and configuration of system(s) and/or device(s) that hosts vehicle selection platform 230. As shown, cloud computing environment 240 may include a group of computing resources 235 (referred to collectively as "computing resources 235" and individually as "computing resource 235").

Computing resource 235 includes one or more personal computers, workstation computers, server devices, and/or another type of computation and/or communication device. In some implementations, computing resource 235 may host vehicle selection platform 230. The cloud resources may include compute instances executing in computing resource 235, storage devices provided in computing resource 235, data transfer devices provided by computing resource 235, and/or the like. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, and/or the like.

Application 235-1 may include one or more software applications that may be provided to or accessed by user device 210 and/or data storage device 220. Application 235-1 may eliminate a need to install and execute the software applications on these devices. For example, application 235-1 may include software associated with vehicle selection platform 230 and/or any other software capable of being provided via cloud computing environment 240. In some implementations, one application 235-1 may send/receive data to/from one or more other applications 235-1, via virtual machine 235-2.

Virtual machine 235-2 may include a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program and may support a single process. In some implementations, virtual machine 235-2 may execute on behalf of another device (e.g., user device 210, data storage device 220, and/or the like), and may manage infrastructure of cloud computing environment 240, such as data management, synchronization, or long-duration data transfers.

Virtualized storage 235-3 may include one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 may provide hardware virtualization techniques that allow multiple operating systems (e.g., "guest operating systems") to execute concurrently on a host computer, such as computing resource 235. Hypervisor 235-4 may present a virtual operating platform to the guest operating systems and may manage the execution of the guest operating systems. Multiple instances of a variety of operating systems may share virtualized hardware resources.

Network 250 includes one or more wired and/or wireless networks. For example, network 250 may include a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
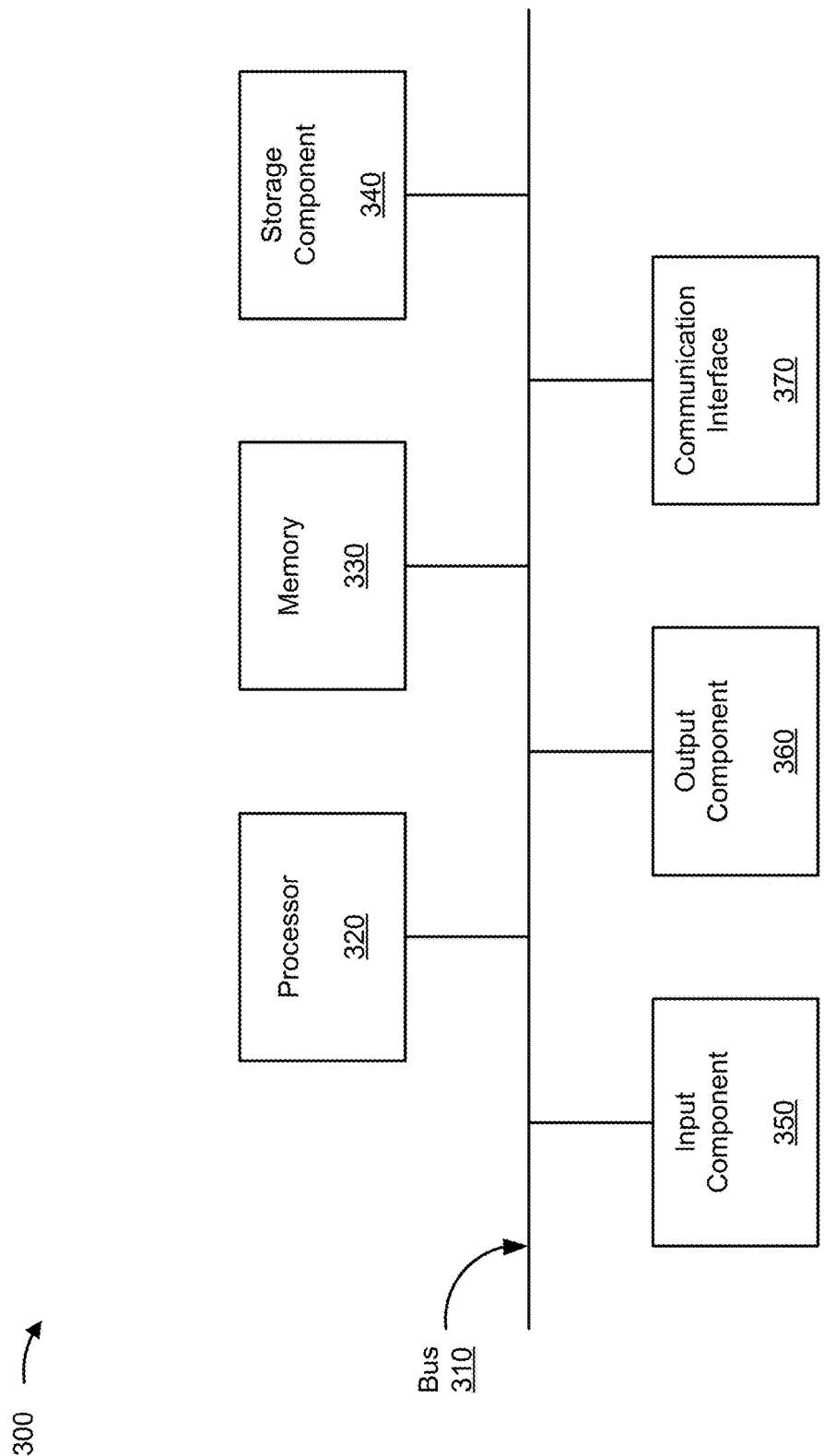
FIG. 3 is a diagram of example components of one or more devices of FIG. 2.

FIG. 3 is a diagram of example components of a device 300. Device 300 may correspond to user device 210, data storage device 220, and/or vehicle selection platform 230. In some implementations, user device 210, data storage device 220, and/or vehicle selection platform 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores data and/or instructions for use by processor 320.

Storage component 340 stores data and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive data, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output data from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive data from another device and/or provide data to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
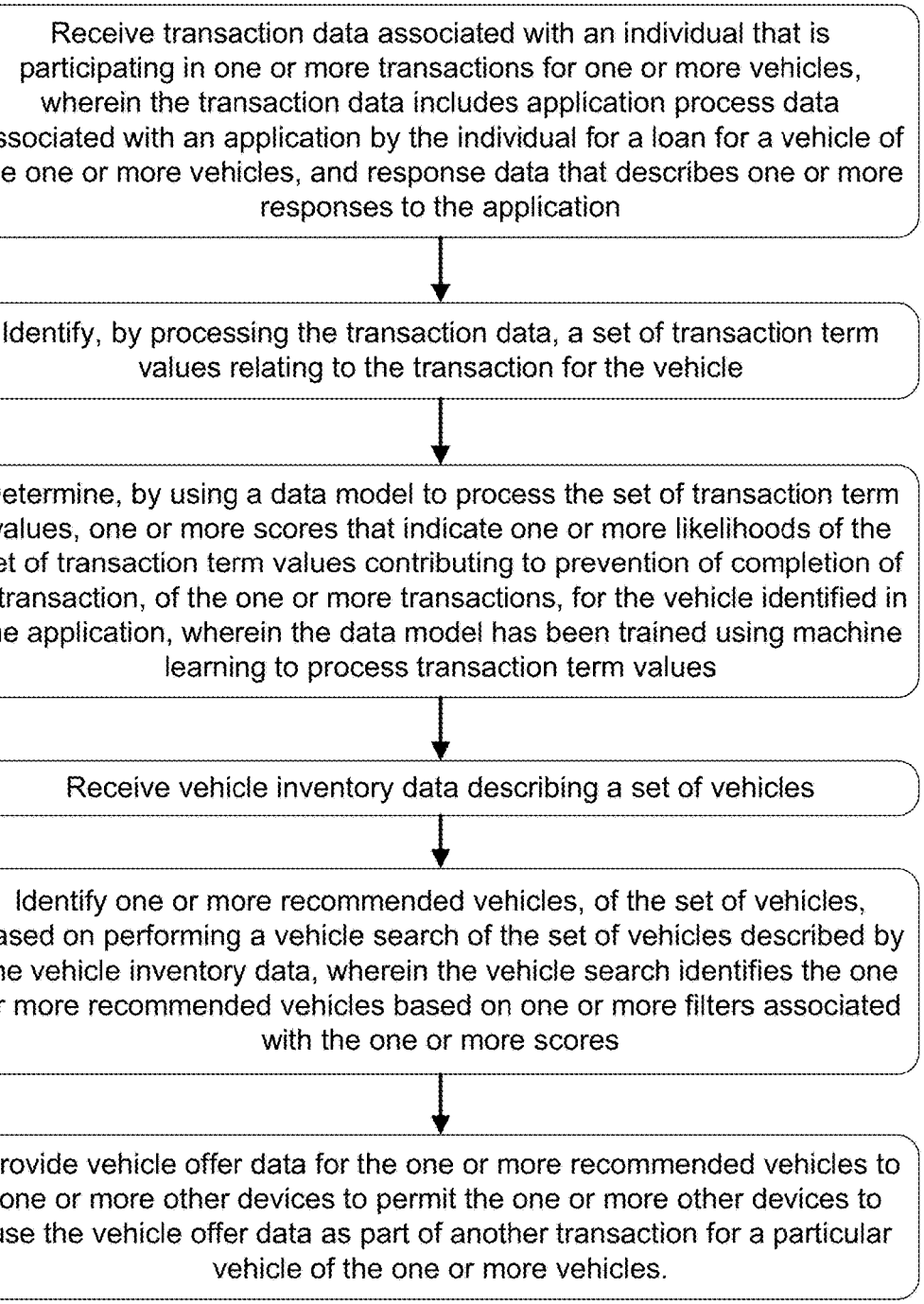
FIGS. 4-6 are flowcharts of an example process for determining that an individual is unlikely to complete a transaction for a vehicle and for identifying one or more recommended vehicles to offer to the individual.

FIG. 4 is a flow chart of an example process 400 for determining that an individual is unlikely to complete a transaction for a vehicle and for identifying one or more recommended vehicles to offer to the individual. In some implementations, one or more process blocks of FIG. 4 may be performed by a vehicle selection platform (e.g., vehicle selection platform 230). In some implementations, one or more process blocks of FIG. 4 may be performed by another device or a group of devices separate from or including the vehicle selection platform, such as a user device (e.g., user device 210), a data storage device (e.g., data storage device 220), and/or the like.

As shown in FIG. 4, process 400 may include receiving transaction data associated with an individual that is participating in one or more transactions for one or more vehicles, wherein the transaction data includes application process data associated with an application by the individual for a loan for a vehicle of the one or more vehicles, and response data that describes one or more responses to the application (block 410). For example, the vehicle selection platform (e.g., using computing resource 235, processor 320, memory 330, storage component 340, input component 350, communication interface 370, and/or the like) may receive transaction data associated with an individual that is participating in one or more transactions for one or more vehicles, as described above. In some implementations, the transaction data may include application process data associated with an application by the individual for a loan for a vehicle of the one or more vehicles, and response data that describes one or more responses to the application.

As further shown in FIG. 4, process 400 may include identifying, by processing the transaction data, a set of transaction term values relating to the transaction for the vehicle (block 420). For example, the vehicle selection platform (e.g., using computing resource 235, processor 320, memory 330, storage component 340, and/or the like) may identify, by processing the transaction data, a set of transaction term values relating to the transaction for the vehicle, as described above.

As further shown in FIG. 4, process 400 may include determining, by using a data model to process the set of transaction term values, one or more scores that indicate one or more likelihoods of the set of transaction term values contributing to prevention of completion of a transaction, of the one or more transactions, for the vehicle identified in the application, wherein the data model has been trained using machine learning to process transaction term values (block 430). For example, the vehicle selection platform (e.g., using computing resource 235, processor 320, memory 330, storage component 340, and/or the like) may determine, by using a data model to process the set of transaction term values, one or more scores that indicate one or more likelihoods of the set of transaction term values contributing to prevention of completion of a transaction, of the one or more transactions, for the vehicle identified in the application, as described above. In some implementations, the data model may have been trained using machine learning to process transaction term values.

As further shown in FIG. 4, process 400 may include receiving vehicle inventory data describing a set of vehicles (block 440). For example, the vehicle selection platform (e.g., using computing resource 235, processor 320, memory 330, storage component 340, input component 350, communication interface 370, and/or the like) may receive vehicle inventory data describing a set of vehicles, as described above.

As further shown in FIG. 4, process 400 may include identifying one or more recommended vehicles, of the set of vehicles, based on performing a vehicle search of the set of vehicles described by the vehicle inventory data, wherein the vehicle search identifies the one or more recommended vehicles based on one or more filters associated with the one or more scores (block 450). For example, the vehicle selection platform (e.g., using computing resource 235, processor 320, memory 330, storage component 340, and/or the like) may identify one or more recommended vehicles, of the set of vehicles, based on performing a vehicle search of the set of vehicles described by the vehicle inventory data, as described above. In some implementations, the vehicle search may identify the one or more recommended vehicles based on one or more filters associated with the one or more scores.

As further shown in FIG. 4, process 400 may include providing vehicle offer data for the one or more recommended vehicles to one or more other devices to permit the one or more other devices to use the vehicle offer data as part of another transaction for a particular vehicle of the one or more vehicles (block 460). For example, the vehicle selection platform (e.g., using computing resource 235, processor 320, memory 330, storage component 340, output component 360, communication interface 370, and/or the like) may provide vehicle offer data for the one or more recommended vehicles to one or more other devices to permit the one or more other devices to use the vehicle offer data as part of another transaction for a particular vehicle of the one or more vehicles, as described above.

Process 400 may include additional implementations, such as any single implementation or any combination of implementations described below and/or in connection with one or more other processes described elsewhere herein.

In some implementations, the one or more filters include a transaction terms preferences filter that filters the vehicle inventory data that describes the set of vehicles based on configured preferences of the individual for particular transaction term values. In some implementations, the vehicle selection platform may receive, after identifying the set of transaction term values, credit data that identifies a credit score or credit history of the individual. In some implementations, the vehicle inventory data for the set of vehicles may correspond to one or more ranges of acceptable transaction term values that particular loan providers will offer individuals based on a given credit score or a given credit history. In some implementations, the one or more filters may include a credit filter that filters the set of vehicles based on the credit data and the one or more ranges of acceptable transaction term values.

In some implementations, the vehicle selection platform may receive location data that specifies a first geographic location of a user device associated with the individual or a second geographic location of a particular dealership. In some implementations, the one or more filters include a location filter that filters the set of vehicles based on whether the location data satisfies configurable location criteria.

In some implementations, the vehicle selection platform may receive transaction history data that describes a set of previous transactions made by the individual. In some implementations, determining the one or more scores comprises determining the one or more scores based on the transaction data and the transaction history data.

In some implementations, the vehicle selection platform may receive vehicle preferences data that identifies a set of vehicle preferences of the individual. In some implementations, the one or more filters may include a vehicle preferences filter that filters the vehicle inventory data that describes the set of vehicles based on the set of vehicle preferences of the individual.

In some implementations, when identifying the one or more recommended vehicles, the vehicle selection platform may determine a set of scores that are part of a metric that measures a predicted level of interest of the individual in the set of vehicles, and may identify a recommended vehicle, of the one or more recommended vehicles, based on one or more of the set of scores.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
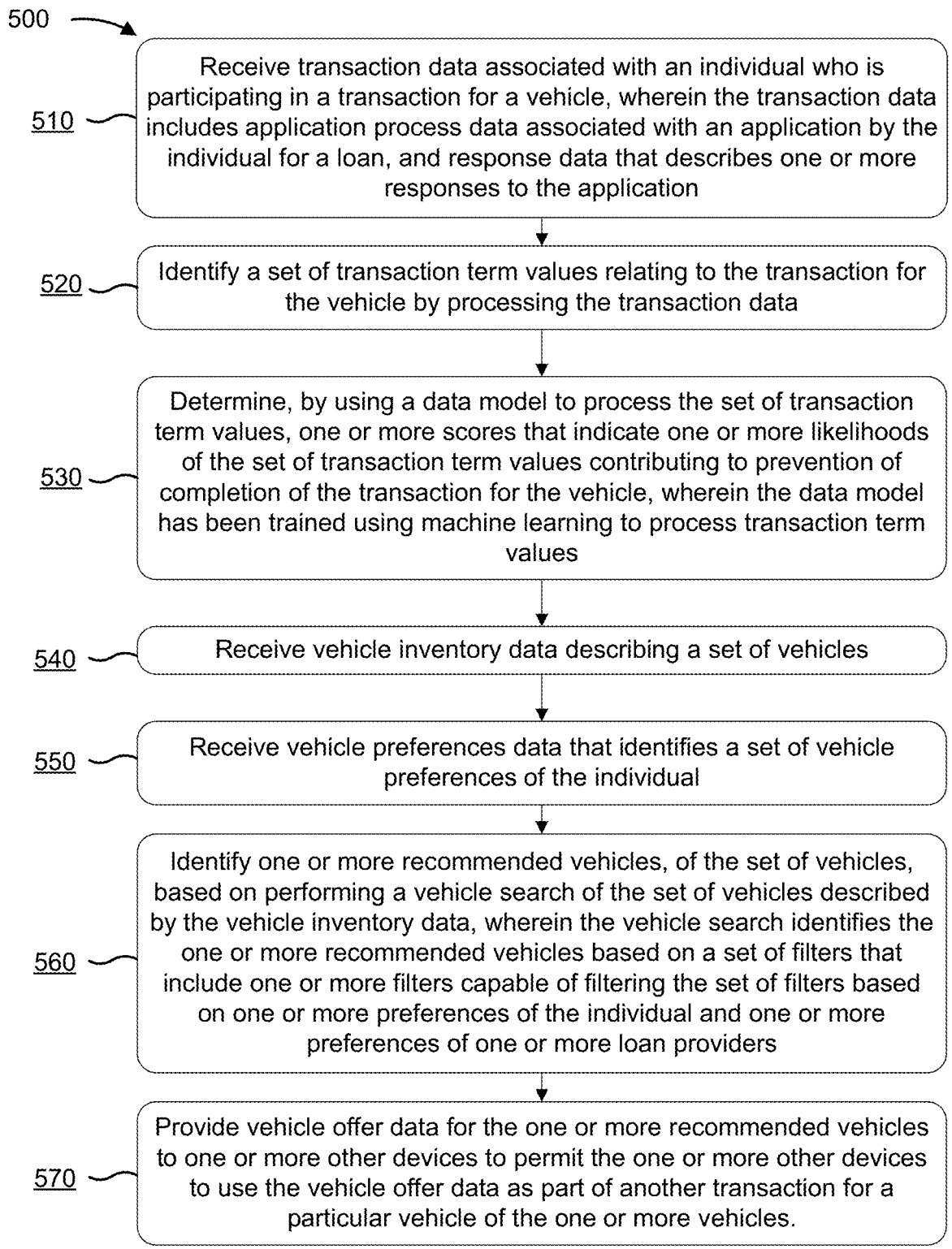

FIG. 5 is a flow chart of an example process 500 for determining that an individual is unlikely to complete a transaction for a vehicle and for identifying one or more recommended vehicles to offer to the individual. In some implementations, one or more process blocks of FIG. 5 may be performed by a vehicle selection platform (e.g., vehicle selection platform 230). In some implementations, one or more process blocks of FIG. 5 may be performed by another device or a group of devices separate from or including the vehicle selection platform, such as a user device (e.g., user device 210), a data storage device (e.g., data storage device 220), and/or the like.

As shown in FIG. 5, process 500 may include receiving transaction data associated with an individual who is participating in a transaction for a vehicle, wherein the transaction data includes application process data associated with an application by the individual for a loan, and response data that describes one or more responses to the application (block 510). For example, the vehicle selection platform (e.g., using computing resource 235, processor 320, memory 330, storage component 340, input component 350, communication interface 370, and/or the like) may receive transaction data associated with an individual who is participating in a transaction for a vehicle, as described above. In some implementations, the transaction data may include application process data associated with an application by the individual for a loan, and response data that describes one or more responses to the application.

As further shown in FIG. 5, process 500 may include identifying a set of transaction term values relating to the transaction for the vehicle by processing the transaction data (block 520). For example, the vehicle selection platform (e.g., using computing resource 235, processor 320, memory 330, storage component 340, and/or the like) may identify a set of transaction term values relating to the transaction for the vehicle by processing the transaction data, as described above.

As further shown in FIG. 5, process 500 may include determining, by using a data model to process the set of transaction term values, one or more scores that indicate one or more likelihoods of the set of transaction term values contributing to prevention of completion of the transaction for the vehicle, wherein the data model has been trained using machine learning to process transaction term values (block 530). For example, the vehicle selection platform (e.g., using computing resource 235, processor 320, memory 330, storage component 340, and/or the like) may determine, by using a data model to process the set of transaction term values, one or more scores that indicate one or more likelihoods of the set of transaction term values contributing to prevention of completion of the transaction for the vehicle, as described above. In some implementations, the data model may have been trained using machine learning to process transaction term values.

As further shown in FIG. 5, process 500 may include receiving vehicle inventory data describing a set of vehicles (block 540). For example, the vehicle selection platform (e.g., using computing resource 235, processor 320, memory 330, storage component 340, input component 350, communication interface 370, and/or the like) may receive vehicle inventory data describing a set of vehicles, as described above.

As further shown in FIG. 5, process 500 may include receiving vehicle preferences data that identifies a set of vehicle preferences of the individual (block 550). For example, the vehicle selection platform (e.g., using computing resource 235, processor 320, memory 330, storage component 340, input component 350, communication interface 370, and/or the like) may receive vehicle preferences data that identifies a set of vehicle preferences of the individual, as described above.

As further shown in FIG. 5, process 500 may include identifying one or more recommended vehicles, of the set of vehicles, based on performing a vehicle search of the set of vehicles described by the vehicle inventory data, wherein the vehicle search identifies the one or more recommended vehicles based on a set of filters that include one or more filters capable of filtering the set of vehicles based on one or more preferences of the individual and one or more preferences of one or more loan providers (block 560). For example, the vehicle selection platform (e.g., using computing resource 235, processor 320, memory 330, storage component 340, and/or the like) may identify one or more recommended vehicles, of the set of vehicles, based on performing a vehicle search of the set of vehicles described by the vehicle inventory data, as described above. In some implementations, the vehicle search may identify the one or more recommended vehicles based on a set of filters that include one or more filters capable of filtering the set of vehicles based one or more preferences of the individual and one or more preferences of one or more loan providers.

As further shown in FIG. 5, process 500 may include providing vehicle offer data for the one or more recommended vehicles to one or more other devices to permit the one or more other devices to use the vehicle offer data as part of another transaction for a particular vehicle of the one or more vehicles (block 570). For example, the vehicle selection platform (e.g., using computing resource 235, processor 320, memory 330, storage component 340, output component 360, communication interface 370, and/or the like) may provide vehicle offer data for the one or more recommended vehicles to one or more other devices to permit the one or more other devices to use the vehicle offer data as part of another transaction for a particular vehicle of the one or more vehicles, as described above.

Process 500 may include additional implementations, such as any single implementation or any combination of implementations described below and/or in connection with one or more other processes described elsewhere herein.

In some implementations, the set of filters further include at least one of: a first filter that capable of filtering based on particular vehicles, of the set of vehicles, being available for sale, a second filter capable of filtering based on credit data of the individual, or a third filter capable of filtering based on geographic location.

In some implementations, the one or more filters may include a transaction terms preferences filter that filters the vehicle inventory data that describes the set of vehicles based on configured preferences of the individual for particular transaction term values. In some implementations, the vehicle selection platform may receive, after identifying the set of transaction term values, credit data that identifies a credit score or credit history of the individual. In some implementations, the vehicle inventory data for the set of vehicles may correspond to one or more ranges of acceptable transaction term values that particular loan providers will offer individuals based on a given credit score or a given credit history. In some implementations, the set of filters may further include a credit filter that filters the set of vehicles based on the credit data and the one or more ranges of acceptable transaction term values.

In some implementations, the vehicle selection platform may receive transaction history data that describes a set of previous transactions made by the individual or by individuals with similar user data as the individual. In some implementations, when determining the one or more scores, the vehicle selection platform may determine the one or more scores based on the transaction data and the transaction history data.

In some implementations, the one or more filters may include a vehicle preferences filter that filters the set of vehicles based on the set of vehicle preferences of the individual. In some implementations, when identifying the one or more recommended vehicles, the vehicle selection platform may determine a set of scores that are part of a metric that measures a predicted level of interest of the individual in the set of vehicles. In some implementations, the set of scores may be determined by using another data model to process two or more of: the set of transaction term values, the vehicle inventory data, or user data for the individual. In some implementations, the vehicle selection platform may identify a recommended vehicle, of the one or more recommended vehicles, based on one or more of the set of scores.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
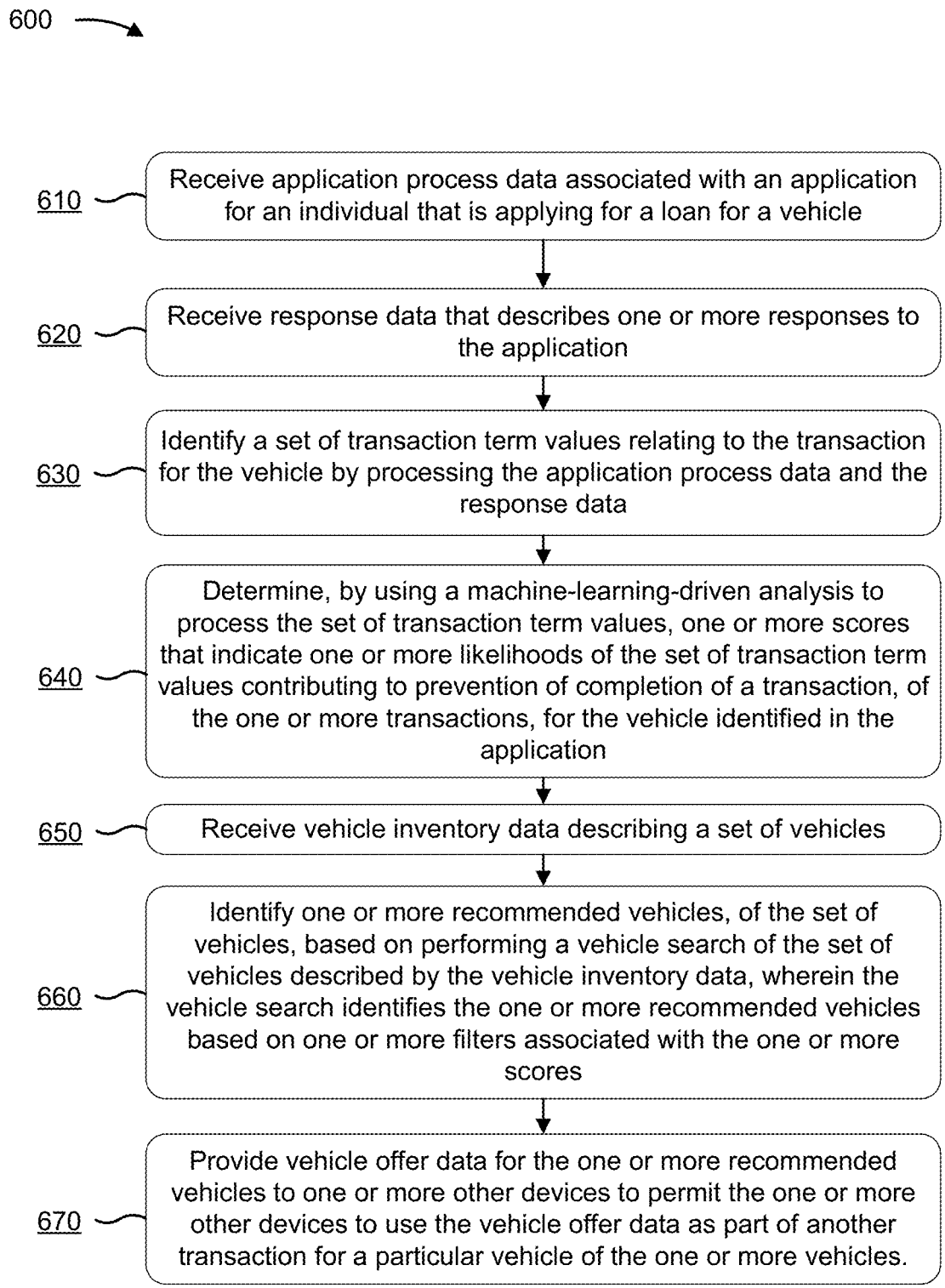

FIG. 6 is a flow chart of an example process 600 for determining that an individual is unlikely to complete a transaction for a vehicle and for identifying one or more recommended vehicles to offer to the individual. In some implementations, one or more process blocks of FIG. 6 may be performed by a vehicle selection platform (e.g., vehicle selection platform 230). In some implementations, one or more process blocks of FIG. 6 may be performed by another device or a group of devices separate from or including the vehicle selection platform, such as a user device (e.g., user device 210), a data storage device (e.g., data storage device 220), and/or the like.

As shown in FIG. 6, process 600 may include receiving application process data associated with an application for an individual that is applying for a loan for a vehicle (block 610). For example, the vehicle selection platform (e.g., using computing resource 235, processor 320, memory 330, storage component 340, input component 350, communication interface 370, and/or the like) may receive application process data associated with an application for an individual that is applying for a loan for a vehicle, as described above.

As further shown in FIG. 6, process 600 may include receiving response data that describes one or more responses to the application (block 620). For example, the vehicle selection platform (e.g., using computing resource 235, processor 320, memory 330, storage component 340, input component 350, communication interface 370, and/or the like) may receive response data that describes one or more responses to the application, as described above.

As further shown in FIG. 6, process 600 may include identifying a set of transaction term values relating to the transaction for the vehicle by processing the application process data and the response data (block 630). For example, the vehicle selection platform (e.g., using computing resource 235, processor 320, memory 330, storage component 340, and/or the like) may identify a set of transaction term values relating to the transaction for the vehicle by processing the application process data and the response data, as described above.

As further shown in FIG. 6, process 600 may include determining, by using a machine-learning-driven analysis to process the set of transaction term values, one or more scores that indicate one or more likelihoods of the set of transaction term values contributing to prevention of completion of a transaction, of the one or more transactions, for the vehicle identified in the application (block 640). For example, the vehicle selection platform (e.g., using computing resource 235, processor 320, memory 330, storage component 340, and/or the like) may determine, by using a machine-learning-driven analysis to process the set of transaction term values, one or more scores that indicate one or more likelihoods of the set of transaction term values contributing to prevention of completion of a transaction, of the one or more transactions, for the vehicle identified in the application, as described above.

As further shown in FIG. 6, process 600 may include receiving vehicle inventory data describing a set of vehicles (block 650). For example, the vehicle selection platform (e.g., using computing resource 235, processor 320, memory 330, storage component 340, input component 350, communication interface 370, and/or the like) may receive vehicle inventory data describing a set of vehicles, as described above.

As further shown in FIG. 6, process 600 may include identifying one or more recommended vehicles, of the set of vehicles, based on performing a vehicle search of the set of vehicles described by the vehicle inventory data, wherein the vehicle search identifies the one or more recommended vehicles based on one or more filters (block 660). For example, the vehicle selection platform (e.g., using computing resource 235, processor 320, memory 330, storage component 340, and/or the like) may identify one or more recommended vehicles, of the set of vehicles, based on performing a vehicle search of the set of vehicles described by the vehicle inventory data, as described above. In some implementations, the vehicle search may identify the one or more recommended vehicles based on one or more filters.

As further shown in FIG. 6, process 600 may include providing vehicle offer data for the one or more recommended vehicles to one or more other devices to permit the one or more other devices to use the vehicle offer data as part of another transaction for a particular vehicle of the one or more vehicles (block 670). For example, the vehicle selection platform (e.g., using computing resource 235, processor 320, memory 330, storage component 340, output component 360, communication interface 370, and/or the like) may provide vehicle offer data for the one or more recommended vehicles to one or more other devices to permit the one or more other devices to use the vehicle offer data as part of another transaction for a particular vehicle of the one or more vehicles, as described above.

Process 600 may include additional implementations, such as any single implementation or any combination of implementations described below and/or in connection with one or more other processes described elsewhere herein.

In some implementations, the one or more filters may include a transaction terms preferences filter that filters the vehicle inventory data that describes the set of vehicles based on configured preferences of the individual for particular transaction term values. In some implementations, the vehicle selection platform may receive, as part of the application process data, pre-approval data that includes credit data that identifies a credit score or credit history of the individual. In some implementations, the vehicle inventory data for the set of vehicles may correspond to one or more ranges of acceptable transaction term values that particular loan providers will offer individuals based on a given credit score or a given credit history. In some implementations, the one or more filters may include a credit filter that filters the set of vehicles based on the credit data and the one or more ranges of acceptable transaction term values.

In some implementations, the vehicle selection platform may receive location data that specifies a first geographic location of a user device associated with the individual or a second geographic location of a particular dealership. In some implementations, the one or more filters may include a location filter that filters the set of vehicles based on whether the location data satisfies configurable location criteria.

In some implementations, the vehicle selection platform may receive transaction history data that describes a set of previous transactions made by the individual. In some implementations, when determining the one or more scores, the vehicle selection platform may determine the one or more scores based on the transaction data and the transaction history data.

In some implementations, the vehicle selection platform may receive vehicle preferences data that identifies a set of vehicle preferences of the individual. In some implementations, the one or more filters may include a vehicle preferences filter that filters the vehicle inventory data that describes the set of vehicles based on the set of vehicle preferences of the individual.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, and/or the like. A user interface may provide information (e.g., data) for display. In some implementations, a user (sometimes referred to herein as an individual, a customer, and/or the like) may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
  receiving, by a device, conversation data associated with an individual that is participating in a transaction associated with a first vehicle,
    wherein the conversation data includes data defining communications between the individual and an entity associated with the transaction;
  identifying, by the device and based on processing the conversation data, a set of transaction term values relating to the transaction;

providing, by the device, the set of transaction term values as input to a data model,
  wherein the data model has been trained to process transaction term values to generate scores that indicate likelihoods of the transaction term values contributing to prevention of completion of particular transactions;
receiving, by the device, as output from the data model, and based on providing the set of transaction term values as the input to the data model, one or more scores that indicate one or more likelihoods of the set of transaction term values contributing to prevention of completion of the transaction;
determining, by the device, that the one or more scores satisfy a score threshold;
configuring, by the device, one or more filters based on the one or more scores satisfying the score threshold,
  wherein the one or more filters includes a transaction terms preferences filter that filters a data set associated with a set of available vehicles based on configured preferences of the individual for particular transaction term values;
filtering, by the device and using the one or more filters, the data set associated with the set of available vehicles; and
identifying, by the device, a second vehicle, different from the first vehicle, based on filtering the data set associated with the set of vehicles.

2. The method of claim 1, wherein the conversation data comprises:
textual communications between the individual and the entity, or
voice communications between the individual and the entity.

3. The method of claim 1, further comprising:
determining, based on the one or more scores, that a particular transaction term value is associated with a particular limit; and
wherein identifying the second vehicle further comprises:
  identifying the second vehicle based on the second vehicle being associated with a transaction term value within the particular limit.

4. The method of claim 1, wherein the conversation data comprises information from a plurality of data streams, each of the plurality of data streams being associated with a different source of the information.

5. The method of claim 4, wherein the plurality of data streams includes at least one of:
an audio recording of a first conversation,
a video recording of a second conversation, or
textual data input to a website or an application associated with the individual or the entity.

6. The method of claim 1, further comprising:
identifying, based on processing the conversation data, a particular transaction term that is indicated by the individual as being more important to the individual relative to another transaction term; and
providing, to another device associated with the entity, information identifying the particular transaction term as being more important to the individual relative to the other transaction term.

7. The method of claim 1, further comprising:
obtaining result data indicating a result associated with the transaction; and
iteratively training the data model, using the result data, until a threshold level of accuracy is reached.

8. A device, comprising:
one or more memories; and
one or more processors, communicatively coupled to the one or more memories, configured to:
  receive conversation data associated with an individual that is participating in a transaction associated with a first vehicle,
    wherein the conversation data includes data defining communications between the individual and an entity associated with the transaction;
  identify, based on processing the conversation data, a set of transaction term values relating to the transaction;
  provide the set of transaction term values as input to a data model,
    wherein the data model has been trained to process transaction term values to generate scores that indicate likelihoods of the transaction term values contributing to prevention of completion of particular transactions;
  receive, as output from the data model and based on providing the set of transaction term values as the input to the data model, one or more scores that indicate one or more likelihoods of the set of transaction term values contributing to prevention of completion of the transaction;
  determine that the one or more scores satisfy a score threshold;
  configure one or more filters based on the one or more scores satisfying the score threshold,
    wherein the one or more filters includes a transaction terms preferences filter that filters a data set associated with a set of available vehicles based on configured preferences of the individual for particular transaction term values;
  filter, using the one or more filters, the data set associated with the set of available vehicles; and
  identify a second vehicle, different from the first vehicle, based on filtering the data set associated with the set of vehicles.

9. The device of claim 8, wherein the conversation data comprises:
textual communications between the individual and the entity, or
voice communications between the individual and the entity.

10. The device of claim 8, wherein the one or more processors are further configured to:
determine, based on the one or more scores, that a particular transaction term value is associated with a particular limit; and
wherein the one or more processors, when identifying the second vehicle, are configured to:
  identify the second vehicle based on the second vehicle being associated with a transaction term value within the particular limit.

11. The device of claim 8, wherein the conversation data comprises information from a plurality of data streams, each of the plurality of data streams being associated with a different source of the information.

12. The device of claim 11, wherein the plurality of data streams includes at least one of:
an audio recording of a first conversation,
a video recording of a second conversation, or
textual data input to a website or an application associated with the individual or the entity.

13. The device of claim 8, wherein the one or more processors are further configured to:
- identify, based on processing the conversation data, a particular transaction term that is indicated by the individual as being more important to the individual relative to another transaction term; and
- provide, to another device associated with the entity, information identifying the particular transaction term as being more important to the individual relative to the other transaction term.

14. The device of claim 8, wherein the one or more processors are further configured to:
- obtain result data indicating a result associated with the transaction; and
- iteratively train the data model, using the result data, until a threshold level of accuracy is reached.

15. A non-transitory computer-readable medium storing a set of instructions, the set of instructions comprising:
- one or more instructions that, when executed by one or more processors of a device, cause the device to:
  - receive conversation data associated with an individual that is participating in a transaction associated with a first vehicle,
    - wherein the conversation data includes data defining communications between the individual and an entity associated with the transaction;
  - identify, based on processing the conversation data, a set of transaction term values relating to the transaction;
  - provide the set of transaction term values as input to a data model,
    - wherein the data model has been trained to process the set of transaction term values to generate scores that indicate likelihoods of the transaction term values contributing to prevention of completion of particular transactions;
  - receive, as output from the data model and based on providing the set of transaction term values as the input to the data model, one or more scores that indicate one or more likelihoods of the set of transaction term values contributing to prevention of completion of the transaction;
  - determine that the one or more scores satisfy a score threshold;
  - configure one or more filters based on the one or more scores satisfying the score threshold,
    - wherein the one or more filters includes a transaction terms preferences filter that filters a data set associated with a set of available vehicles based on configured preferences of the individual for particular transaction term values;
  - filter, using the one or more filters, the data set associated with the set of available vehicles; and
  - identify a second vehicle, different from the first vehicle, based on filtering the data set associated with the set of available vehicles.

16. The non-transitory computer-readable medium of claim 15, wherein the conversation data comprises:
- textual communications between the individual and the entity, or
- voice communications between the individual and the entity.

17. The non-transitory computer-readable medium of claim 15, wherein the one or more instructions, that cause the device to identify the set of transaction term values, cause the device to:
- process the conversation data to convert audio data that is included in the conversation data to text data.

18. The non-transitory computer-readable medium of claim 15, wherein the conversation data comprises information from a plurality of data streams, each of the plurality of data streams being associated with a different source of the information.

19. The non-transitory computer-readable medium of claim 18, wherein the plurality of data streams includes at least one of:
- an audio recording of a first conversation,
- a video recording of a second conversation, or
- textual data input to a website or an application associated with the individual or the entity.

20. The non-transitory computer-readable medium of claim 15, wherein the one or more instructions further cause the device to:
- identify, based on processing the conversation data, a particular transaction term that is indicated by the individual as being more important to the individual relative to another transaction term; and
- provide, to another device associated with the entity, information identifying the particular transaction term as being more important to the individual relative to the other transaction term.

* * * * *